United States Patent Office 2,912,099
Patented Nov. 10, 1959

2,912,099
AUTOMATIC WIRE-TYING MACHINE

Shirley B. Brouse, Chicago, and Paul W. Fawcett, Western Springs, Ill., assignors to United States Steel Corporation, a corporation of New Jersey Application November 20, 1956, Serial No. 623,458

9 Claims. (Cl. 203—12)

This invention relates to machines for applying and securing wire ties to bundles, boxes, bales or other packages, and especially to machines for automatically performing the several operations involved, in rapid sequence.

More particularly, this invention relates to improvements in wire-tying machines of the general type shown in Vining et al. Patent No. 2,416,859. In the operation of this type of wire-tying machine the supply wire, from which a tie is to be made, is fed around a guide track in the form of a loop, with the ends of the tie overlapped in the slot of a knotter pinion. Then, when a tie is to be applied to a package, the package is placed within the track, the wire is pulled back to draw the tie tight around the package and is then finally tensioned. The overlapped ends of the tie are then twisted together by the knotter pinion and the tie is cut free from the supply wire and ejected from the pinion.

The improvements claimed herein relate generally to the means for feeding the wire around the guide track and subsequently pulling it therefrom into initial engagement with a package, and to the means for receiving and holding the surplus length of wire initially fed into the guide track which exceeds the length actually needed to encircle the bundle when the tie is drawn tight around it. Other parts of the machine, such as the means for finally tensioning the tie, the knotter-pinion actuating mechanism and the guide track may be of any suitable construction. They are shown only diagrammatically and are not claimed herein.

A complete understanding of the invention may be obtained from the following detailed description and explanation which refer to the accompanying drawings illustrating the present preferred embodiment. In the drawings:

Figure 18 is a simplified control circuit.

Figures 1, 7:
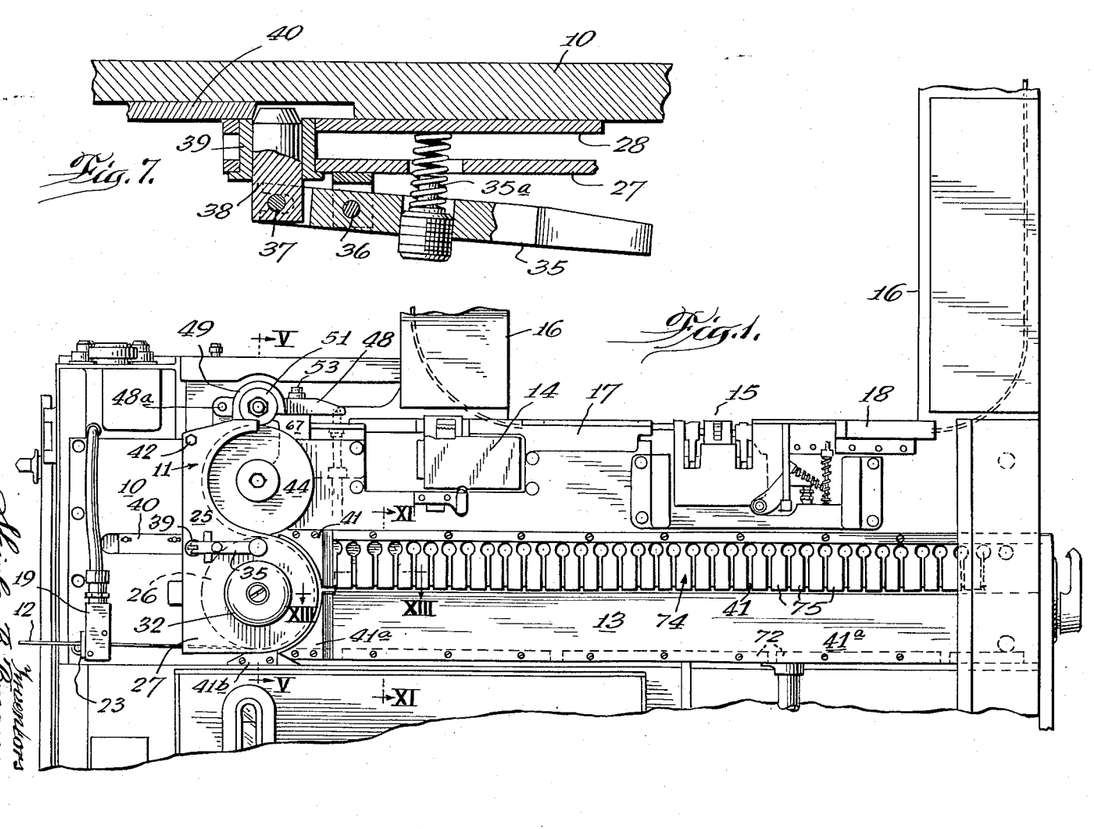
Figure 1 is a side elevation with portions broken away.
Figure 7 is a partial section taken along the plane of line VII—VII of Figure 2.
Figure 2:
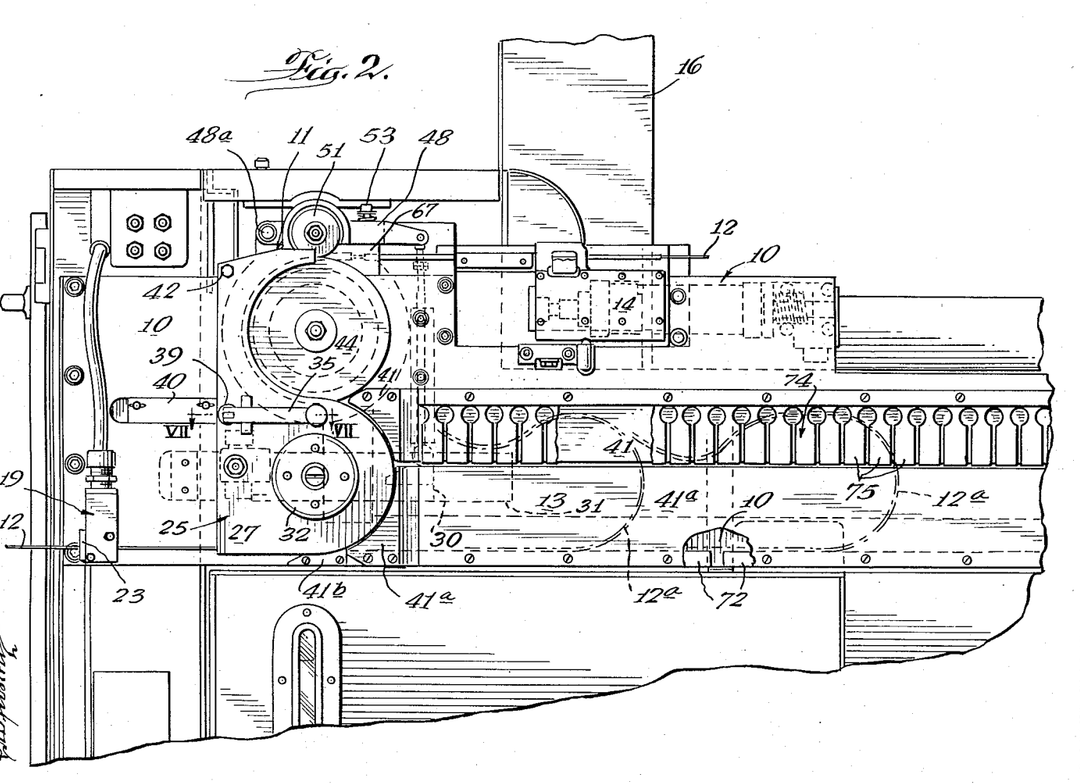
Figure 2 is a portion of Figure 1 to an enlarged scale.
Figure 3:
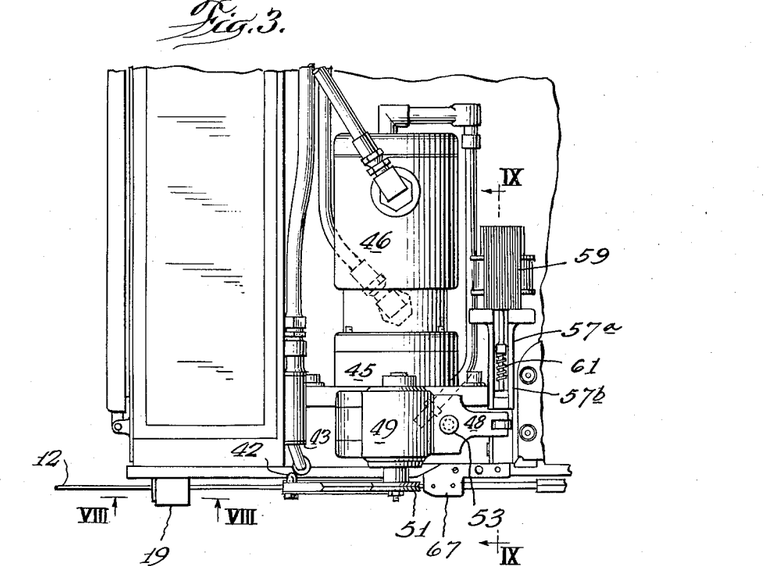
Figure 3 is a partial plan view with coverplate removed, showing a portion of Figure 2.
Figure 4:
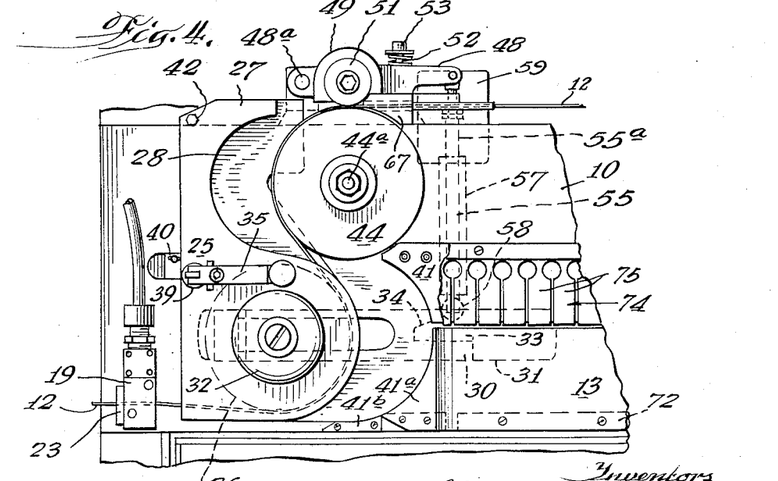
Figure 4 is a portion of Figure 2 showing parts in an alternate position.

Referring now in detail to the drawings and, for the present to Figures 1–3, the principal working parts of the machine there shown are mounted on a plate 10 disposed vertically and secured to a supporting frame of structural members (not shown) at one side thereof. These parts include reversible means indicated generally at 11 for feeding in wire 12, which may be round or flat, from an external supply coil and pulling it back, a receiver 13 for holding surplus wire when pulled back, tie-tensioning means 14, knotter mechanism 15 and a guide track 16. A left-hand guide chute 17 connects tensioning means 14 to the knotter mechanism and a right-hand guide chute 18 connects the knotter mechanism to the guide track 16. The usual table or supporting plate overlies the knotter mechanism to hold bundles or packages while the tie is being applied and secured therearound. As already pointed out, the novel features disclosed in detail and claimed herein are those forming parts of feed-in means 11 and receiver 13.

Wire 12, on entering the machine, passes first through a wire-end detector indicated generally at 19 (see Figures 1–3 and 8). This device comprises a hollow block 20 having a micro-switch 21 therein, adapted to be actuated by a plunger 22 fitted with a wire-engaging roller 22a. The wire is threaded through an entry guide 23 which is inserted in a transverse passage 24 through block 20. The plunger 22 is spring-biased downward but is held up against the spring pressure by the wire when it is threaded through guide 23. Thus, when the trailing end of a coil of supply wire passes through the guide, or in case of a break in the wire, the plunger is released and switch 21 is operated to stop the wire-driving means and give a signal. The length of wire remaining in the machine may then be easily pulled out by hand. The plunger and switch arrangement also prevents operation of the machine unless the wire is in place.

From the wire-end detector 19, the wire passes to a slidable guide-roll housing 25 and around a sheave 26 enclosed therein (see Figures 1, 2, 4 and 5). The housing comprises spaced plates 27 and 28 with suitable spacer means therebetween. Sheave 26 is journalled in a slide bar 30 reciprocable in a slot 31 milled in the inner face of plate 10. Housing 25 is mounted on bar 30, reciprocable manually therewith, by means of a knob 32 on the shaft of sheave 26 which is exposed on the outer face of plate 27, from the working position shown in Figures 1 and 2 to the threading position shown in Figure 4, to facilitate threading of the wire 12. A stud 33 projecting rearwardly from slide 30 has a wedge face 34 thereon (see Figures 4 and 5) for a purpose which will appear later.

Housing 25 is releasably held in the inner most or working position by a latching mechanism shown in Figure 7. This mechanism comprises a thumb lever 35 pivoted at 36 on plate 27, biased by a spring 35a to the illustrated position. Lever 35 has a fork-and-pin connection 37 to a locking pin 38 reciprocable in a bushing 39 extending through plates 27 and 28 and engaging the end of an adjustable stop plate 40 slidable in a slot in plate 10. Pin 38 is tapered at its inner end and will therefore be forced outwardly against the pressure of spring 35a, by an abnormal force on the housing 25 tending to retract it from the working position. Such a force will result from the reaction in the wire being fed, if a kink should form therein when the kink strikes guide 23 and prevenets further advance of the wire. Lever 35 is positioned to be conveniently operated by the thumb of the hand grasping knob 32, when it is desired to retract the housing manually. Spring 35a, of course, resets pin 38 when the housing is restored to working position. Sheathing plates 41, 41a and a block 41b (see Figure 4) secured to plate 10 with spaces therebetween cooperate with the right-hand edge of plate 27 which is of S-shape, to define a passage confining the wire when it is pulled back to tighten around the package.

When housing 25 is in working position, a dome-headed nut on a bolt 42 extending through the housing actuates a limit switch 43 (see Figure 3). Switch 43, like switch 21, controls operation of the wire-driving means now to be described.

Figures 5, 8:
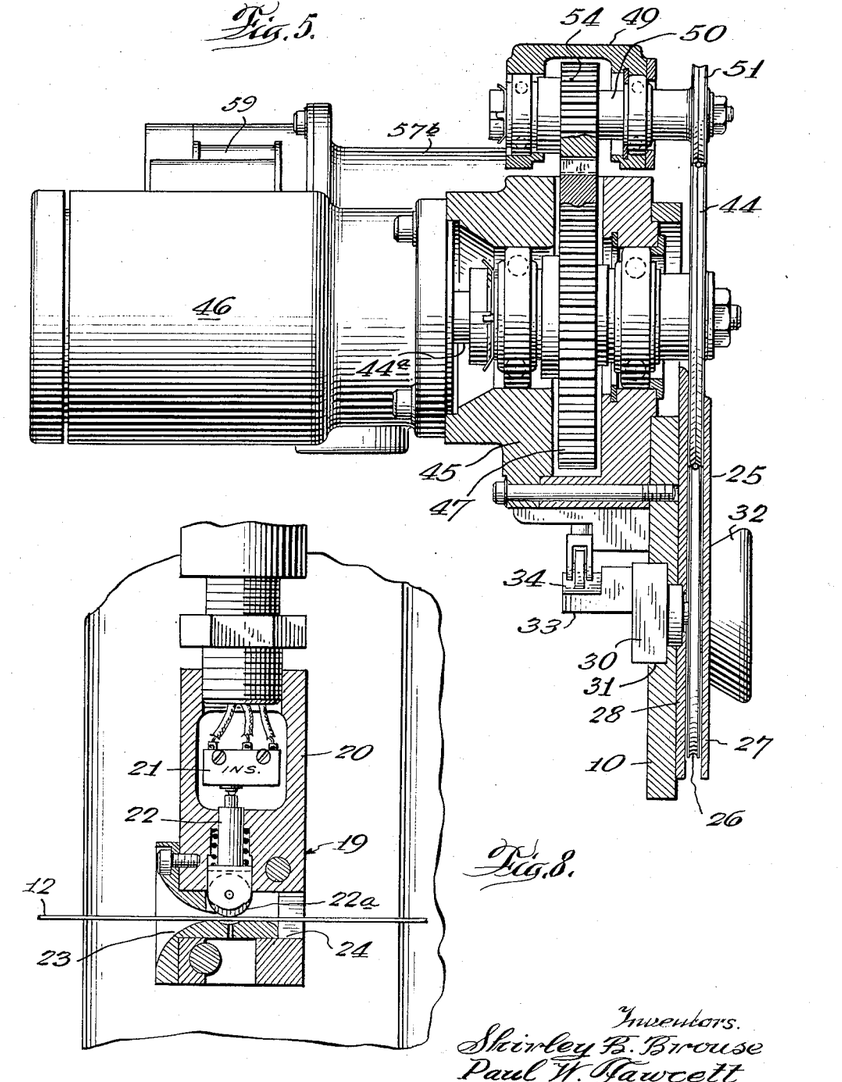
Figure 5 is a section taken along the plane of line V—V of Figure 1 with parts in elevation.
Figure 8 is a partial section taken on the plane of line VIII—VIII of Figure 3.

The wire-driving means includes a sheave 44 mounted on a shaft 44a journaled in a gear housing 45 secured to plate 10 as shown in Figure 5. The axis of sheave 26 is vertically alined with that of sheave 44 when housing 25 is in working position. In such position, the edge of plate 27 overlaps a portion of the periphery of sheave 44 as shown in Figures 1 and 2. Shaft 44a is directly connected to a reversible hydraulic motor 46 of known construction secured to housing 45. A gear 47 located in housing 45 is also mounted on shaft 44a.

Figure 6:
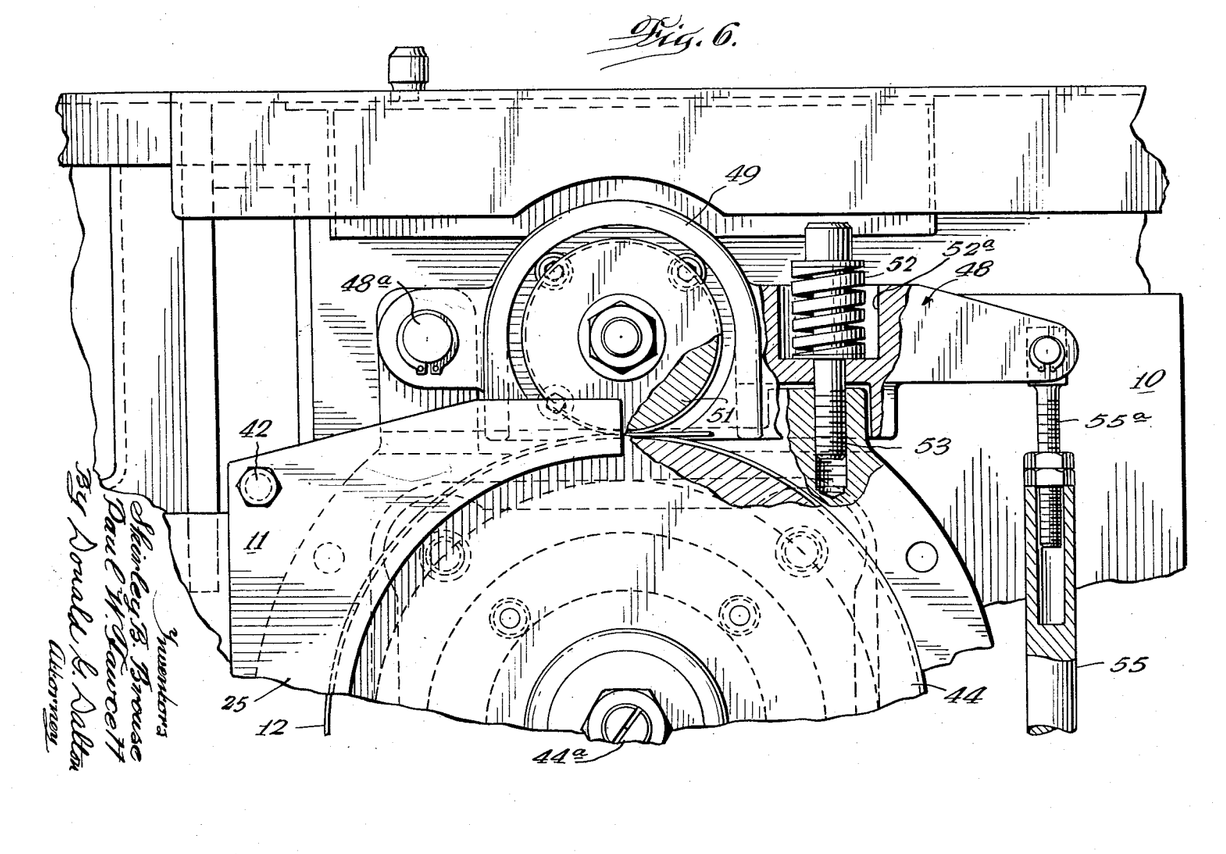
Figure 6 shows a portion of Figure 2 to a further enlarged scale with parts omitted and portions in section.

A lever 48 pivoted to housing 45 at 48a (see Figures 2, 5 and 6) embodies a pinion shroud 49 and carries bearings in which a shaft 50 is journaled in vertical alinement with shaft 44a. A pinch roll 51 is mounted on the shaft 50 and is adapted to cooperate with sheave 44. Lever 48 is biased toward housing 45 by a spring 52 seated in a socket 52a in the lever and compressed by a screw 53 adjustably threaded into a tapped hole in the housing. A pinion 54 on shaft 50 within shroud 49 meshes with gear 47.

By virtue of the construction described, sheave 44 and pinch roll 51 normally exert sufficient friction on wire 12 inserted therebetween to feed it forward or retract it on operation of motor 46 in one direction or the other. The pivot bearing 48a of lever 48 permits raising the pinch roll to facilitate insertion of the wire between sheave and pinch roll in threading, and also permits immediate termination of the driving force when desired, by means now to be described.

As shown in Figures 2, 4, 6 and 9, a push rod 55 has an adjusting screw 55a extending into its upper end and pivoted to the end of lever 48 opposite the pivot bearing 48a thereof. Push rod 55 is slidable in vertically spaced bushings 56 seated in alined holes in a bracket 57 secured to the rear face of plate 10 (see Figure 9). A roller 58 journaled at the lower end of rod 55 is adapted to be engaged by wedge face 34 of stud 33 when slide 30 is retracted to the threading position (see Figure 4). This tilts lever 48 upwardly and raises pinch roll 51 from the wire between it and sheave 44 or from the sheave if there is no wire between them. The pinch roll is thus automatically raised in preparation for threading when housing 25 is retracted for that purpose.

Figures 9, 10:
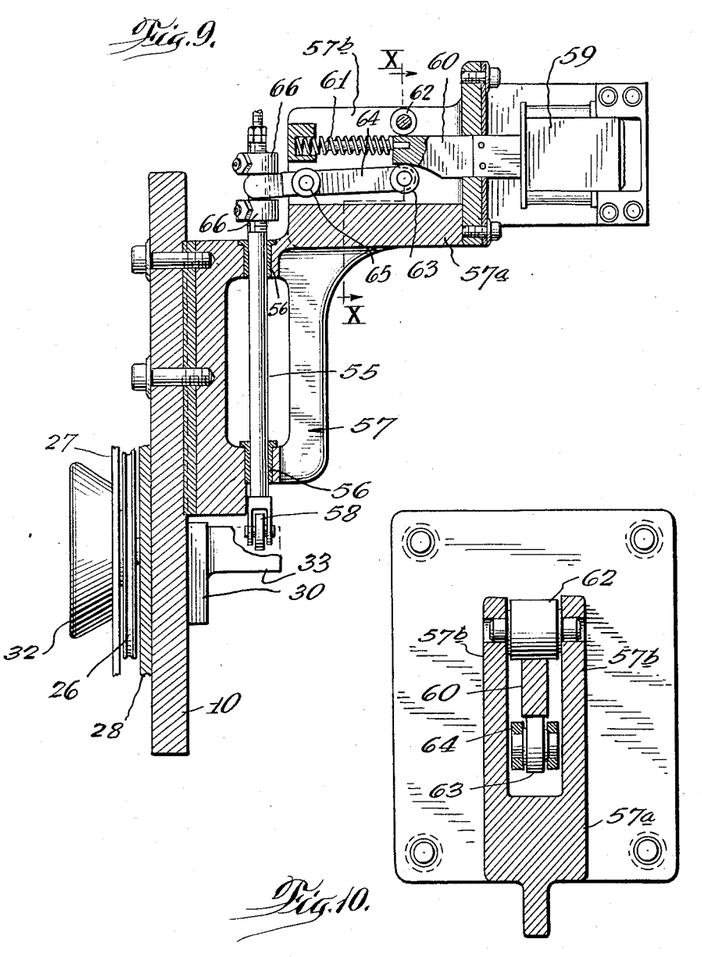
Figure 9 is a partial section taken along the plane of line IX—IX of Figure 3.
Figure 10 is a partial section taken along the plane of line X—X of Figure 9.
Figures 11, 12, 14:
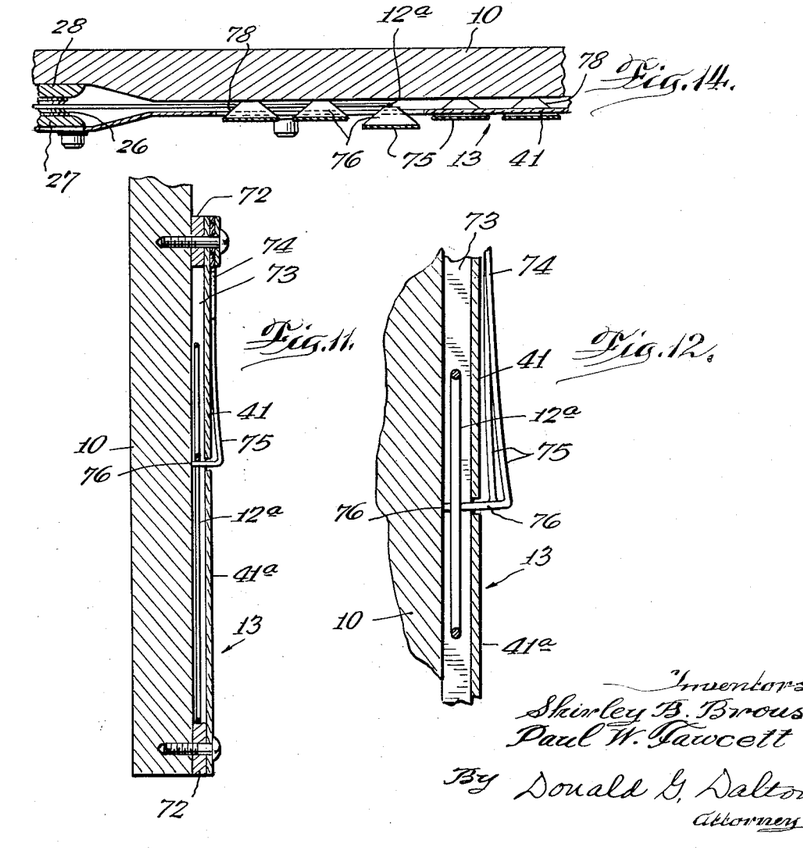
Figure 11 is a partial section taken along the plane of line XI—XI of Figure 1.
Figure 12 is a portion of Figure 11 with a part in alternate position.
Figure 14 is a view similar to Figure 13 showing parts in alternate positions.
Figure 13:
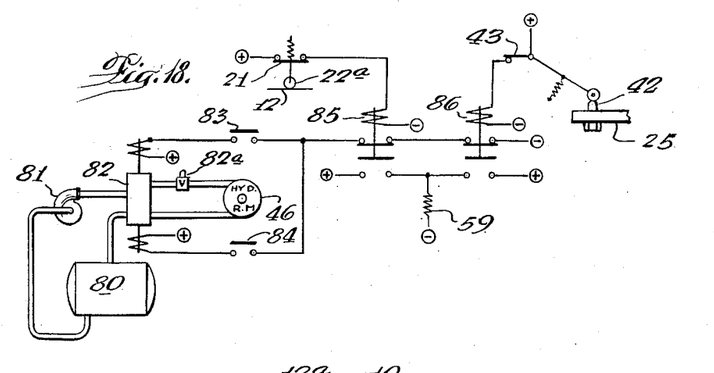
Figure 13 is a partial section taken along the plane of line XIII—XIII of Figure 1.
Figures 15, 16, 17:
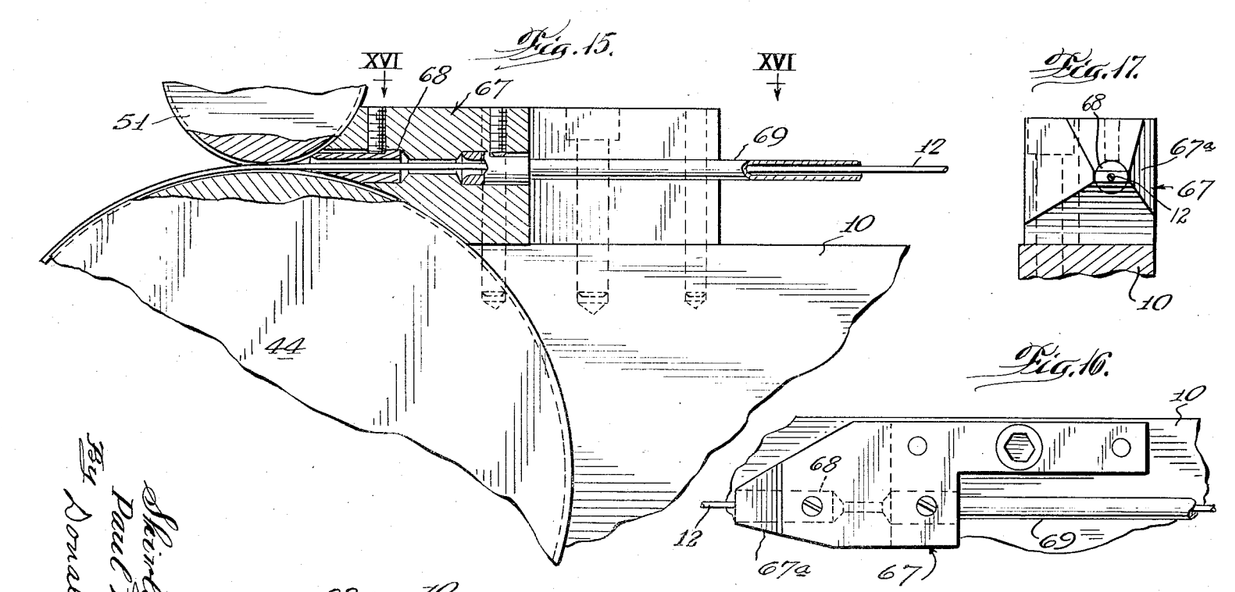
Figure 15 is a portion of Figure 2 to enlarged scale, with parts in section.
Figure 16 is a plan view of parts shown in Figure 15.
Figure 17 is an end view looking to the right of a part shown in Figure 15.

Electromagnetic means shown in Figure 9 are also provided for actuating push rod 55 to control feeding of the wire 12. A solenoid 59 mounted on a rearward extension 57a of bracket 57 is adapted to advance a wedge bar 60 against the force of a compression spring 61. The tapering forward end of bar 60 works between rollers 62 and 63. Roller 62 is journaled in the spaced side walls 57b of extension 57a, as shown in Figure 10. Roller 63 is journaled in the forked end of a rocker arm 64. These arms are pivoted on a pin 65 seated in walls 57b and extend beyond their pivotal axis on opposite sides of push rod 55 and between bearing collets 66 screwed on the threaded upper end thereof. The collets are secured in adjusted position thereon by set screws.

By virtue of this construction, lever 48 is tilted upwardly by energization of solenoid 59. This permits stopping the wire instantaneously when desired during its forward or reverse feed, or on the occurrence of a break on arrival of a coil end without any overtravel resulting from the momentum of motor 46, gear 47 and sheave 44.

The lift of rod 55 by either wedging surface 34 or wedging bar 60 is very slight and does not affect normal meshing of pinion 54 with gear 47.

Switch 21, as previously explained, is normally held open by the presence of wire under roller 22a. When it closes, it completes a circuit for solenoid 59 to stop further feeding of wire, as well as stopping motor 46 by means of a solenoid-operated valve (not shown) controlling the supply of pressure fluid thereto.

Switch 43 is likewise normally open when actuated by movement of housing 25 to operating position. When the housing is retracted either by hand or by the arrival of a kink at guide 23, the switch closes a circuit for solenoid 59 to stop further feeding of wire.

Wire fed to the guide track 16 by sheave 44 and pinch roll 51, on leaving the latter, enters a block 67 (see Figures 1–4 and 15–17) secured to the upper edge of plate 10. Block 67 has a tapering nose 67a extending into the nip between the sheave and roll on the exit side thereof and is drilled longitudinally and counterbored to receive an insert guide sleeve 68 at the entrance end. A guide tube 69 has an enlarged head seated in a counterbore in the exit end of the block. This tube directs the advancing wire through the tensioning means 14 whence it is guided into the left-hand guide track 17.

The means for receiving the loop of surplus wire formed when sheave 44 is driven to pull the wire out of the guide track 16 is shown in Figures 1, 2 and 11–14. Sheathing plates 41 and 41a are secured to plate 10 with spacer strips 72 therebetween, defining a shallow pocket 73 of a width equal to the axial width of sheave 26, adapted to receive the wire loop indicated at 12a. The surplus wire is ejected from between sheaves 26 and 44 into the pocket 73 along the upper edge thereof. A strip 74 of spring steel overlies plate 41 and is slotted upwardly from its lower edge to form a plurality of spring fingers 75. Fingers 75 have their lower ends bent to form tongues 76 entering the space between the adjacent edges of plates 41, 41a. The sides of the tongues 76 are beveled as at 78 whereby the tongues are successively displaced as the loop 12a lengthens (see Figure 14). The tongues prevent the upper run of the horizontally extending loop from sagging excessively yet permit the surplus to be freely pulled out of the pocket on the next tie-feeding operation before additional wire is drawn from the supply coil.

Reference has been made above to the control of the wire-driving means by switches 21 and 43. Figure 18 is a circuit by which such control may be obtained. Operating fluid for motor 46 is delivered from a reservoir 80 by a pump 81, under the control of a solenoid reversing valve 82. This valve is operated automatically in one direction or another from a neutral position, by any suitable means, to drive the motor in the forward or reverse direction at the proper times in the overall cycle. Switches 83 and 84 actuated by such means effect the desired valve operation. The energizing circuit for both solenoids of valve 82 includes the front contacts of relays 85 and 86, in series. Relay 85 is held energized as long as switch 21 is closed. Switch 43 similarly controls relay 86. The opening of either of these switches, therefore, will cause valve 82 to stop motor 46 if it is operating or prevent its starting when switch 83 or 84 is next closed.

Although we have shown the use of a hydraulic motor for driving shaft 44a it will be noted that any other type motor can be used for this purpose, as desired. However, use of a hydraulic motor is preferred due to the ease with which fine adjustments in speed may be made with such a motor.

Relays 85 and 86 have back contacts either of which, when closed, completes a circuit for solenoid 59. Thus the opening of either switch 21 or switch 43, in addition to stopping motor 46 or preventing it from being started, actuates push rod 55 to raise pinch roll 51, thereby insuring immediate stoppage of the wire feed.

It will be apparent from the foregoing that the invention provides wire-feeding and wire-receiving means for a tying machine having important advantages. Positive driving of the wire is effected by the driven sheave and cooperating pinch roll. Advance of the wire may nevertheless be instantaneously arrested by lifting the pinch roll. Initial threading of the wire around the idler guide sheave and the driving sheave is facilitated by the mounting of the former in a slidable housing. Both sheaves are exposed when housing 25 is retracted. Retraction of the housing automatically lifts the pinch roll. The yieldable latch including lever 35 holds the housing in working position until abnormal force is applied tending to retract it as by the occurrence of a kink in the wire which is arrested by the entrance guide 23. Automatic stoppage of the feed results from this occurrence and also on passage of the end of a coil of wire through detector 19.

The pocket for receiving the surplus length of wire is always open and the loop extends itself readily thereinto on reversal of the driving sheave. The upper run of the loop is always held suspended by the spring fingers 75 so as to prevent tangling or kinking when the loop is pulled out to form the next tie.

Although we have disclosed herein the preferred practice and embodiment of our invention, we intend to cover as well any change or modification therein which may be made without departing from the spirit and scope of the invention.

We claim:

1. In a wire-tying machine, a driving sheave for feeding wire to said machine, a pinch roll cooperating with said sheave to effect a frictional drive on a wire therebetween, means mounting said pinch roll for movement toward and from said sheave, a push rod adapted to engage said mounting means, means for actuating said rod, yieldable means normally urging said pinch roll toward said sheave, means effective positively to move said pinch roll away from said sheave, a guide sheave cooperating with said driving sheave, means mounting the guide sheave for movement from and toward the driving sheave, and means on said last-mentioned mounting means actuating said push rod when the guide sheave is moved away from the driving sheave.

2. A wire-tying machine, a vertically disposed plate, a driving sheave journaled parallel to said plate, a pinch roll cooperating with said sheave for feeding wire to said machine, a housing movable on said plate adjacent said sheave, a guide sheave journaled in said housing adapted to cooperate with said driving sheave when said housing is in a predetermined position relative thereto, a slide bar movable on said plate, and means guiding reciprocating movement of said bar on said plate, said housing being fixed on said bar.

3. A wire-tying machine as defined in claim 2, including means on said slide bar effective to move said pinch roll away from said driving sheave.

4. In a wire-tying machine, a vertically disposed plate, a driving sheave journaled parallel to said plate, a pinch roll cooperating with said sheave for feeding wire to said machine, a housing movable on said plate adjacent said sheave, a guide sheave journaled in said housing adapted to cooperate with said driving sheave when said housing is in a predetermined position relative thereto, and latch means locking said housing in said predetermined position.

5. A wire-tying machine as defined in claim 4, including yieldable means holding said latch means in effective position.

6. In a wire-tying machine, a vertically disposed plate, a driving sheave journaled parallel to said plate, a pinch roll cooperating with said sheave for feeding wire to said machine, a housing movable on said plate adjacent said sheave, a locking pin slidable through said housing adapted to engage a stop on said plate, and a guide sheave journaled in said housing adapted to cooperate with said driving sheave when said housing is in a predetermined position relative thereto.

7. A wire-tying machine as defined in claim 6, including manually operable means effective to withdraw said pin from said hole.

8. A wire-tying machine as defined in claim 6, in which the end of said pin entering said hole is tapered whereby the pin is forced out of the hole by abnormal force tending to move said housing away from said position.

9. In a wire-tying machine, a vertically disposed plate, a driving sheave journaled parallel to said plate, a pinch roll cooperating with said sheave for feeding wire to said machine, a housing movable on said plate adjacent said sheave, a guide sheave journaled in said housing adapted to cooperate with said driving sheave when said housing is in a predetermined position relative thereto, electromagnetic means for causing movement of said pinch roll away from said driving sheave, and a switch controlling said last-mentioned means, mounted adjacent said plate and adapted to be actuated by movement of said housing from and to said position.

References Cited in the file of this patent

UNITED STATES PATENTS

| | | |
|---|---|---|
| 2,416,859 | Vining et al. | Mar. 4, 1947 |
| 2,575,899 | Vining et al. | Nov. 20, 1951 |
| 2,590,806 | Vorderstrasse | Mar. 25, 1952 |
| 2,669,345 | Brown | Feb. 16, 1954 |
| 2,771,984 | Ranney | Nov. 27, 1956 |
| 2,788,463 | Kennedy | Apr. 9, 1957 |
| 2,846,010 | Wheeler | Aug. 5, 1958 |